May 18, 1965 C. V. CUNNINGHAM ETAL 3,184,664
PLURAL MOTOR RAILWAY ACCELERATION CONTROL SYSTEM
Filed June 20, 1962 3 Sheets-Sheet 1

INVENTORS
CLARENCE V. CUNNINGHAM
IRA W. LICHTENFELS
BY Lawrence G. Norris
THEIR ATTORNEY May 18, 1965     C. V. CUNNINGHAM ETAL     3,184,664

PLURAL MOTOR RAILWAY ACCELERATION CONTROL SYSTEM

Filed June 20, 1962     3 Sheets-Sheet 2

INVENTORS
CLARENCE V. CUNNINGHAM
IRA W. LICHTENFELS
BY Lawrence G. Norris
THEIR ATTORNEY INVENTORS
CLARENCE V. CUNNINGHAM
IRA W. LICHTENFELS
BY Lawrence G. Norris
THEIR ATTORNEY United States Patent Office 3,184,664
Patented May 18, 1965

3,184,664
PLURAL MOTOR RAILWAY ACCELERATION
CONTROL SYSTEM
Clarence V. Cunningham and Ira W. Lichtenfels, Erie, Pa., assignors to General Electric Company, a corporation of New York
Filed June 20, 1962, Ser. No. 203,858
7 Claims. (Cl. 318—58)

Our invention relates to a control system for electric railway equipment of the general type in which cam operated sequential resistance and circuit switching is utilized to control traction motor power application and dynamic braking. More particularly, our invention relates to an improved control system of the foregoing general type in which the number of cam positions required in the sequencing equipment is greatly reduced without adversely affecting the overall sequencing capability of the equipment.

Electric railway control systems of the general type in which our invention finds its primary application are well known in the art. In the typical case such systems utilize motor driven cam units which sequentially operate a group of electrical contactors through one or more preselected sequences to provide circuit switching and step resistance changes in the traction motor field circuits and in series connected load resistors to control the tractive effort of the motors.

In order to meet the generally accepted system requirements relating to smoothness of acceleration, passenger comfort, and the like, it is necessary in such systems to provide a certain minimum number of step resistance changes; in other words, to avoid relatively large step changes which would cause undesirably large and abrupt transients. This requirement, when coupled with the circuit switching that must be accomplished, establishes a minimum number of switching positions which the control system must accommodate. In addition, such equipment must usually have the capability of operating over the same switching range in both the forward and reverse direction operating modes.

Now, it is of course well known that the number of cam actuated switching positions that can be accommodated on a single sequential controller is limited by mechanical considerations. It has thus been necessary, in systems with which we are familiar in which the above-mentioned requirements and limitations have been imposed, to provide at least two motor operated controllers to accommodate the full switching range required. By way of example, a system utilizing two sequential controllers is described and claimed in U.S. Patent 3,034,031—Lichtenfels, which is assigned to the same assignee as the present invention. In a co-pending patent application Serial No. 146,599, filed October 20, 1961, in the name of C. V. Cunningham, now Patent No. 3,089,931, there is described and claimed a magnetic latch arrangement which permits a substantial reduction in the number of cam positions required to accommodate a given number of switching conditions. However, even with the substantial reductions in complexity and the number of cam positions permitted by the utilization of that invention, it has still been necessary, in order to accommodate both the forward and reverse modes of operation, to provide two controllers to accommodate the full switching range required in the typical electric railway system.

It is accordingly an object of our invention to provide an improved electric railway control system in which all of the foregoing requirements can be satisfied in a single controller.

It is another object of our invention to provide an improved sequentially operable switching controller for electric railway systems in which both the forward and reverse switching modes may be accommodated over an overlapping range of cam positions.

It is still a further object of our invention to provide an improved latching mechanism applicable to electric railway controllers which allows both the forward and reverse modes of operation to be accommodated in a single range of cam positions.

We accomplish these and other objects of our invention, in one embodiment thereof, by providing single pole, double throw, cam actuated switching contactors on a single controller for connecting the traction motor field circuits in either the forward or reverse direction. In order to provide for utilization of the same range of cam switching positions for both the forward and reverse modes, we provide a two condition, electrically actuated latching mechanism which is associated with the cam actuated reversing contactors such that the same cam sweep will produce either of two selected conditions of the double throw reversing contactors, depending on whether the reverse mode or the forward mode has been selected.

The operation of the latching mechanism is such that the actuating condition of the reversing contactors is determined at the selection of the operator with the controller in the "off" position, so that when the controller sequence begins, the reversing contactors are placed either in the reverse or forward switching mode when the actuating cam begins its sequence, the selected condition being thereafter maintained throughout the remainder of the switching sequence. The same cam mechanism and the same switching sequence can therefore be swept for either the reverse or the forward control mode depending on the preselected setting of the latching mechanism, thereby greatly reducing the number of cam switching positions required while still utilizing full switching capability in both the forward and reverse operating modes. We also provide a memory mechanism associated with the latching mechanism which holds the latching mechanism in the position to which it was last set, thereby requiring a positive reversing signal to reset the latching mechanism to its opposite condition. This avoids difficulties which might otherwise arise out of random movement of the latching mechanism which might be caused by vibration, mechanical shock or the like.

Our invention will be better understood and various other objects and advantages thereof will become apparent from the following specification taken in connection with the accompanying drawings, in which.

Figure 1:
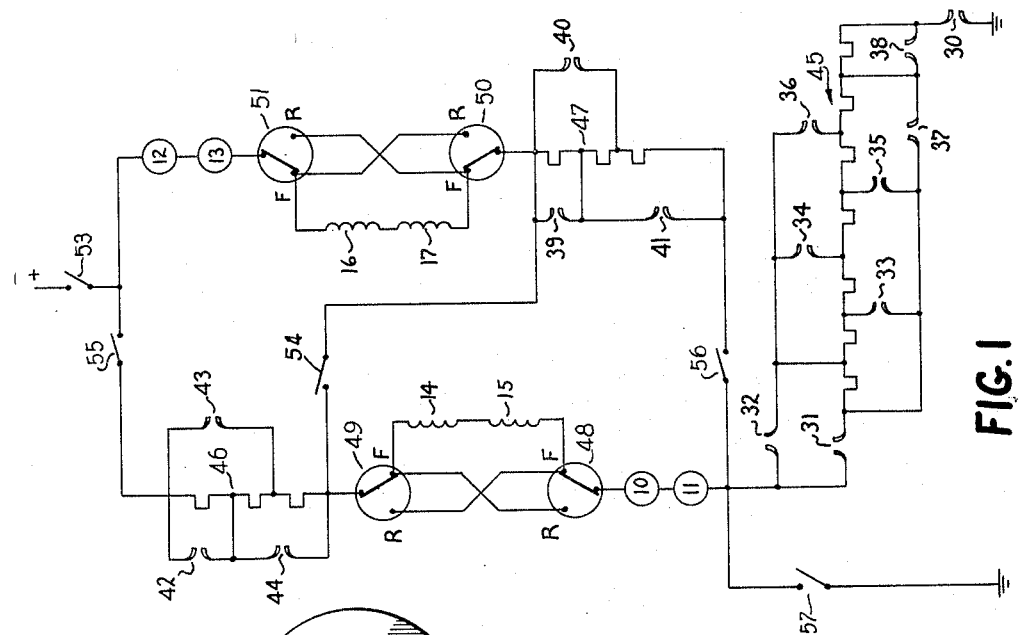
FIG. 1 is a simplified circuit diagram in schematic form illustrating a portion of an electric railway control system embodying our invention.

Referring now in particular to FIG. 1, we have illustrated in simplified form a portion of an electric railway control system embodying our invention. Many of the circuit details not essential to an understanding of our invention have been eliminated in order to permit a more clear and direct explanation of our invention without superfluous detail, and a number of these simplifications will be discussed later on in the specification.

The system of FIG. 1 contains four traction motors 10, 11, 12 and 13 which are connected to drive the railway vehicle with which the system is associated. The traction motors 10, 11, 12 and 13 are provided with field windings 14, 15, 16 and 17, respectively, which are adapted to be series connected for either forward or reverse operation as will later be explained.

The circuit is also provided with a series of contactors numbered 30 through 44, which are cam actuated by a motor driven controller (not shown) in a preselected sequence to step resistance out of the circuit to control the tractive effort. The contactors 30 through 44 are associated with three load resistors 45, 46 and 47 which are connected as shown to limit current flow through the traction motors and their associated field windings to control motor acceleration.

In the typical system, shunt switching means would also be associated with the motor field windings 14, 15, 16 and 17 but since such techniques are well known in the art and since the operation of the embodiment of FIG. 1 will be adequately demonstrated by explaining the step switching sequence utilized with load resistors 45, 46 and 47, we have omitted the field shunt switching from the drawing.

Figure 6:
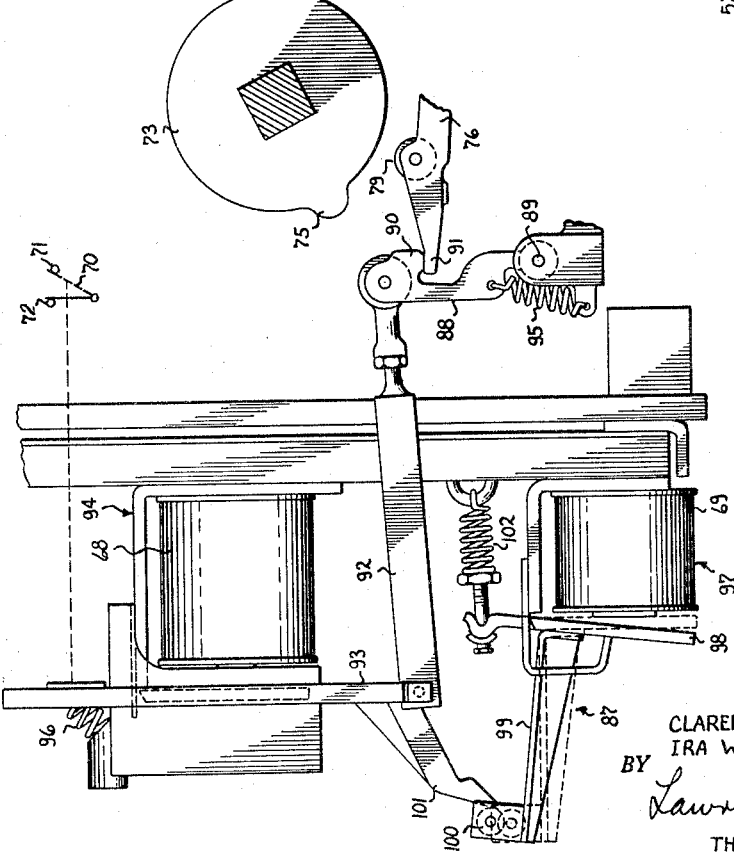
FIG. 6 is a fragmentary view of a portion of the latching mechanism of FIG. 5 showing this mechanism in another condition.
Figure 5:
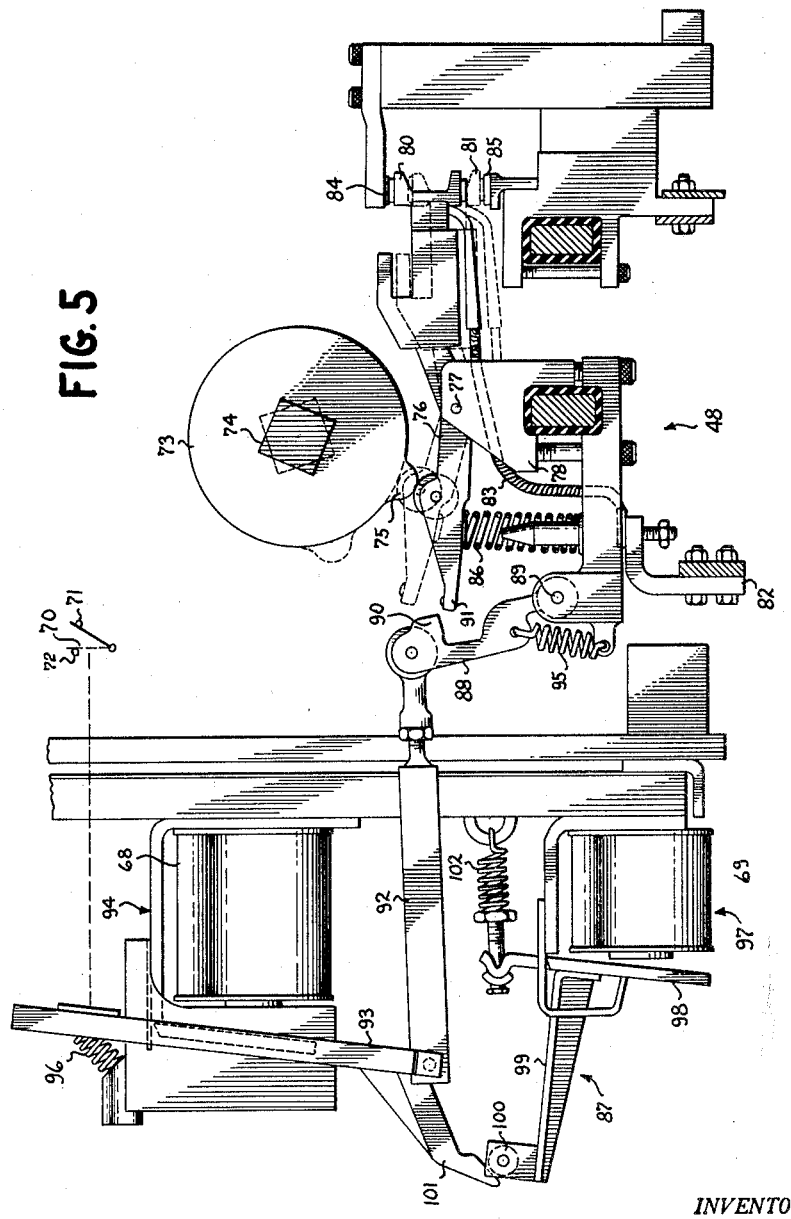
FIG. 5 illustrates one of the cam operated reversing contactors together with its associated latching mechanism for determining the forward or reverse operating mode.

Included in the circuit of FIG. 1 are four cam actuated reversing contactors 48, 49, 50 and 51, the structural details of which are illustrated in FIGS. 5 and 6. The reversing contactors are in the form of single pole, double throw switches and are arranged to connect the traction motor field windings for either the forward or reverse modes of operation. The traction system is powered from a direct current source 52 adapted to be connected to the system through a switch 53.

A relay actuated switch 54 is arranged to connect all four traction motors 10, 11, 12 and 13 and their respective field windings in series relationship through the load resistor 45 to form a high resistance connection which would be used over the lower speed ranges where the generated back electromotive force (E.M.F.) of the traction motors is of lower magnitude. A parallel connection, adapted for use at the higher speed ranges, is formed by the opening of the switch 54 and the closing of relay operated switches 55, 56 and 57. In this connection, two series connected circuit banks are connected in parallel with each other, one bank being formed by the series connection of traction motors 10 and 11 with their field windings 14 and 15 and the load resistor 46, and the other bank being formed by the series connection of the traction motors 12 and 13 with their field windings 16 and 17 and the load resistor 47.

It will be noted that for the series connection formed by the closing of the switch 54, with switches 55, 56 and 57 being open, the load resistors 46 and 47 are cut out of the circuit, and for this connection resistance switching of the load resistor 45 is relied upon for control of tractive effort. For the parallel connection, with switch 54 open and switches 55, 56 and 57 closed, the load resistor 45 is cut out of the circuit by the shunt connection formed by the switch 57, and for this mode control of tractive effort is accomplished by resistance switching of the resistors 46 and 47.

Before proceeding to an explanation of the operation of the circuit of FIG. 1, let us first note the function of the reversing contactors 48, 49, 50 and 51. Each of the contactors is a two position switch and we have labeled the respective positions with the letters "F" and "R" to indicate respectively the "forward" and "reverse" contactor connections. With the circuit in the condition shown in FIG. 1, each of the reversing contactors is set in the forward connection position with the traction motor field windings 14, 15, 16 and 17 thus being set for forward direction traction motor rotation. It will be noted that operation of the reversing contactors 48, 49, 50 and 51 to the "R" position reverses the circuit relationship of the field windings relative to their respective traction motors, thus setting the circuitry for reverse operation.

Figures 2, 3, 4:
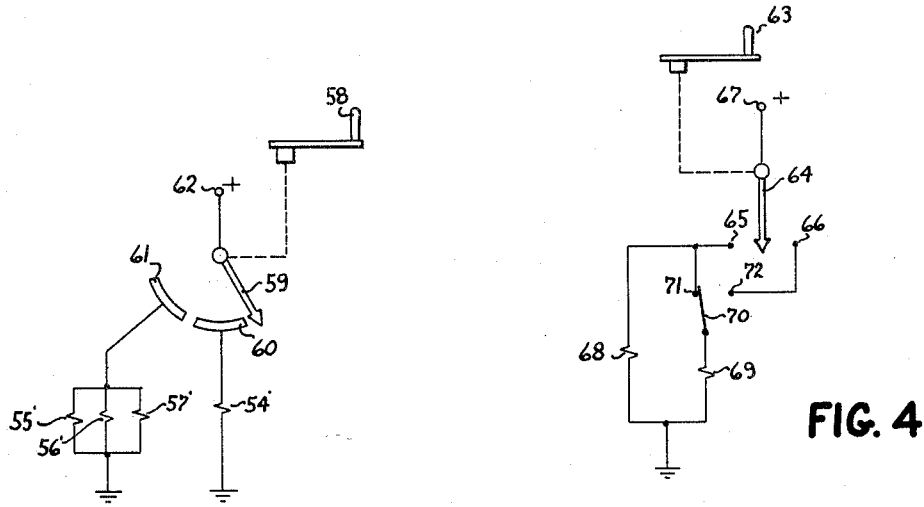
FIG. 2 is a controller sequence diagram showing a portion of the controller sequence associated with the power or acceleration mode of operation of the system.
FIG. 3 is a schematic circuit diagram showing in simplified form the operator control associated with the power mode of operation.
FIG. 4 shows in simplified schematic form the operator control associated with the forward and reverse modes of operation.

Referring now to FIGS. 3 and 4, we have shown in simplified form a portion of the operator control associated with the system of FIG. 1. In order to avoid unnecessary detail we have shown only that portion of the control associated with the forward and reverse power or acceleration mode of operation. The typical system also includes, of course, other modes such as dynamic braking, coasting and the like for both forward and reverse operation. Incidentally, the circuitry of FIG. 1 is also limited to the acceleration or power mode of operation since here also, we have found it unnecessary from the standpoint of explaining the operation of our invention to include other modes such as dynamic braking and coasting.

In FIG. 3, we show an operator's control lever 58 which positions a control arm 59 over two contact sectors 60 and 61. The control arm 59 is connected to a direct current power source 62 as shown. Movement of the control arm 59 onto the contact sector 60 energizes a relay coil 54' which closes the contact 54 in the circuit of FIG. 1. The relay operated contactor 54 is biased to the open position so that de-energization of the coil 54' causes the contactor 54 to return to the open position.

Movement of the control arm 59 onto the contact sector 61 energizes relay coils 55', 56' and 57' which operate respectively to close the contactors 55, 56 and 57 in FIG. 1. Here again, the contactors 55, 56 and 57 are biased to the open position so that de-energization of the relay coils 55', 56' and 57' causes the contactors 55, 56 and 57 to return to the open position.

In FIG. 4, we show another operator's lever 63 which is utilized to determine the forward or reverse mode of operation. The lever 63 controls a control arm 64 which is movable between two electrical contacts 65 and 66. For purposes of explanation, we will identify the contact 65 as the forward contact position and the contact 66 as the reverse contact position. The control arm 64 is connected to a direct current power supply 67 as shown.

With the circuitry in the condition shown in FIG. 4, two relay coils 68 and 69 are connected to be energized by movement of the control arm 64 into circuit contact with the contact 65. Also included in the circuit is a single pole, double throw switch 70 which is movable between two contact points 71 and 72. The circuitry of FIG. 4 is associated with the operation of the latching mechanism and the cam actuated reversing contactors, the structure of which is shown in FIGS. 5 and 6 and the operation of this circuitry will be explained later on in connection with the description of that equipment.

Before describing the structure illustrated in FIGS. 5 and 6, however, it would appear desirable to describe briefly the operation of the system of FIG. 1 with the reversing contactors 48, 49, 50 and 51 set in the circuit condition shown, it being understood that the same switching sequence will apply to both the forward and reverse operating modes. In this respect, reference will be had to the cam sequence diagram shown in FIG. 2 which sets forth the cam operated contactor sequencing over notches 20 to 29 of a 29 notch controller, this range representing the power or acceleration range with the other notch positions being assigned to other modes of operation such as dynamic braking and coasting. The sequence diagram of FIG. 2 is in standard form showing the sequencing of contactors 30 through 44 across the controller notch range 20 to 29.

For the series connection, the controller notches forward from notch 20 to notch 29 and for the parallel circuit connection it notches back from notch 29 to notch 20. Contactors 30 through 38, which are associated with the load resistor 45 perform the resistance switching for the series connection while contactors 39 through 44, associated with load resistors 46 and 47, perform the resistance switch for the parallel connection.

For purposes of explanation, assume that the main power switch 53 is closed and that the operator has moved the control arm 59 into contact with the sector 60 (see FIG. 3) to energize the relay coil 54', thereby causing the contact 54 to close. Contacts 55, 56 and 57 remain open because they are biased to the open position as previously explained.

With contact 54 closed, the circuit is now connected in the series power condition, as has been previously described, with the traction motors 10, 11, 12 and 13 and their field windings 14, 15, 16 and 17 all connected in series through the load resistor 45, the load resistors 46 and 47 being inoperative from a circuit standpoint in this circuit condition.

The switching controller then begins its switching sequence through its cam positions to switch portions of the load resistor 45 out of the circuit as the motor speed increases to control the motor current level and hence the acceleration rate in a manner well known in the art. It will be observed from the sequence diagram of FIG. 2 that as the controller moves from the off position into notch 20, the contactors 30 and 31 are closed, thereby connecting the full resistance of the load resistor 45 into the series circuit. Contactors 39, 41, 42 and 44 are also closed in notch 20 but since the resistors 46 and 47 with which these contactors are associated are not connected in the circuit, this produces no effect on the resistance switching in the series connection. Thus, for the remainder of the description of the switching sequence of the series connected circuit, the operation of contactors 39 through 44 will be ignored.

As the controller sequences to notch 21, contactors 32, 33 and 38 are closed to re-connect and shunt out resistance portions of the load resistor 45, thereby reducing the series connected resistance in the circuit. At notch 23, contactor 34 is closed, producing another reduction in the series load resistance. As traction motor back E.M.F. increases with speed the controller continues to sequence, reducing circuit resistance until it arrives at notch 29 where the minimum resistance point for the series power connection is reached.

The operator may then move into the parallel connection by moving the control arm on to the contact sector 61, energizing relay coils 55', 56' and 57' and de-energizing relay coil 54'. This opens contact 54 and closes contacts 55, 56 and 57 (FIG. 1) to connect the traction motors and their field windings in two parallel banks as has previously been described. In this condition, the load resistor 45 is cut out of the circuit and the resistance sequencing is done with resistors 46 and 47. At the same time, through suitable and well-known means, not shown, the controller is energized to sequence back from notch 29 to notch 20.

During this sequence the load resistor 45 will be stepped back up to its full resistance level as the controller moves back to notch 20, but since the resistor 45 is shunted out of the circuit by the contact 57 for the parallel connection, this will produce no resistance change in the circuit. The sequencing of the load resistors 46 and 47 to reduce circuit resistance as the controller notches back toward notch 20 takes place in accordance with the diagram of FIG. 2, showing the sequencing of contactors 39 through 44, until notch 20 is reached, at which point the circuit resistance is at a minimum with resistors 46 and 47 both fully shunted out.

The control systems associated with the sequencing of the controller through the various notch positions are well known in the art and we have thus not considered it necessary to present further detail in this area. In the typical system, however, it has been necessary to provide duplicate sets of controller cam notch positions to accommodate both the forward and reverse modes of operation. As we have pointed out, this usually requires the use of two controllers to accommodate the full range of positions, with one of these controllers commonly being called the "circuit controller" and the other being called the "resistance controller," as shown for example in Lichtenfels Patent 3,034,031 referred to above.

With the reversing contactors 48, 49, 50 and 51, however, the structural details of which are shown in FIGS. 5 and 6, we can accommodate both the forward and reverse operating modes over a single range of cam positions; in other words, without the necessity for providing a duplicate set of cam positions.

Referring now to the structure shown in FIGS. 5 and 6, we have illustrated one of the reversing contactors 48 adapted to be controlled by an actuating cam 73 which is fixed on the rotatable shaft 74 of the controller. The controller shaft 74 also contains a number of other actuating cam elements which operate the switching contactors including the contactors 30 through 44 of FIG. 1. The cam 73 includes an actuating portion or tang 75 which is positioned as shown in the solid lines in FIG. 5 when the controller is in its off position.

Positioned to be actuated by the cam 73 is a switch arm 76 which is pivotally mounted at 77 on a supporting bracket 78 fixed to the controller structure. Attached to the switch arm 76 is a roller 79 which is adapted to roll against the surface of the cam 73. Also attached to the switch arm 76 at its other end are oppositely facing contacts 80 and 81, which are electrically connected to each other and which are electrically connected to a terminal post 82 by means of a flexible cable 83.

The contacts 80 and 81 are positioned to be brought into contact either with a contact 84 or a contact 85, which are mounted on the controller structure and which are electrically insulated from each other. With the switch arm 76 in the position shown in the solid lines in FIG. 5, the contact 80 is in contact with the contact 84, thus forming an electrical circuit from the terminal 82 through the wire 83 to the contact 84, through which a suitable external circuit connection is made. With the switch arm 76 moved to the position shown in the dotted lines, the circuit through the contact 84 is interrupted and contact is made between contacts 81 and 85, thus establishing a circuit from the terminal 82 through the wire 83 to the contact 85, to which, here again, suitable external circuit connections are made.

The switch arm 76 is resiliently loaded by means of a spring 86 in a direction to urge the roller 79 into rolling contact with the surface of the cam 73. The reversing contactor 48 illustrated in FIG. 5 thus forms a single pole, double throw switch as shown schematically in FIG. 1, the other reversing contactors 49, 50 and 51 being the same structurally as contactor 48.

It will be observed, however, that without further selection means, the reversing contactor 48 would otherwise always operate to the same circuit condition as the cam 73 moves away from its off position, say to a position in which the tang 75 is moved to the point shown in the dotted lines, with the switch arm 76 moving to the position shown in the dotted lines. Therefore, in order to preselect either the reverse or forward condition, we provide a latching mechanism 87 which is operated through the circuitry shown in FIG. 4 in a manner later to be explained.

The latching mechanism 87 comprises a latching arm or detent 88 which is pivotally mounted at 89 and which is provided with a tang portion 90 adapted to engage a lip 91 on the switch arm 76 as shown in FIG. 6. With the detent 88 moved into the position shown in FIG. 6, the switch arm 76 is held against movement in the direction of the actuating cam surface so that as the cam 73 moves away from its off position the detent 88 holds the switch arm in the position shown in the solid lines in FIGS. 5 and 6. With the detent 88 moved back to the position shown in FIG. 5, however, the roller 79 is allowed to track the surface of the cam 73 and the switch arm 76 is accordingly moved to the position shown in the dotted lines in FIG. 5 as the cam moves away from the off position.

Thus the cam 73 can move over the same sequencing arc in either case but depending on the present condition of the detent 88 either one of the two circuit conditions of the reversing contactor may be set.

The detent 88 is controlled by a link 92 which is in turn pivotally secured to the armature 93 of a relay 94 which is actuated by the relay coil 68 as shown in FIG. 4. The latching mechanism is spring loaded by springs 95 and 96 to the position shown in the solid lines in FIG. 5. Energization of the relay coils 68 and 69 (FIG. 4) moves the mechanism to the position shown in FIG. 6.

The latching mechanism also includes a memory device which holds the mechanism in the position to which it was last actuated until a positive actuation signal is applied to establish the opposite condition. This mechanism comprises a relay 97 having an armature 98 with a detent arm 99 attached thereto. Secured to the detent arm 99 is a roller 100 which is adapted to engage a latch 101 which is secured to the armature 93 of the relay 94. The armature 98 is spring loaded to the position shown in the solid lines in FIGS. 5 and 6 by means of a spring 102.

It will be observed that with the mechanism in the condition shown in FIG. 5, the latch 101 engages the roller 100 so as to prevent movement of the detent in the direction of the switch arm 76, thereby ensuring the freedom of the switch arm 76 to track the cam 73. In the condition shown in FIG. 6, the roller 100 has dropped into engagement with the opposite side of the latch 101 thereby preventing movement of the detent 88 out of engagement with the switch arm 76 until the relay 97 is energized to move the roller 100 out of the way. Energization of the relay 97 swings the detent arm 99 and the roller 100 out of the path of the latch 101, thereby permitting movement of the detent 88 to either of its two positions.

The operation of the mechanism shown in FIGS. 5 and 6 will now be explained in terms of its relationship to the circuitry illustrated in FIGS. 1, 3 and 4. First, it should be noted that the relay coil 68 shown in FIG. 4 is connected to actuate the relay 94 which is connected to operate a detent 88 associated with each of the four reversing contactors. In addition, the armature 93 of the relay 94 is connected to operate the two position switch 70 shown in FIG. 3 and we have shown in FIGS. 5 and 6 the positions of the switch 70 corresponding to the positions of the armature 93. In other words, with relay 94 energized and the armature moved to the position shown in FIG. 6, contact is made with contact 72, and with the relay in the de-energized position as shown in FIG. 5, the switch 70 is in the position shown in FIG. 5 with contact being made with the contact 71. It will be observed that the switch 70 is connected in series with the relay coil 69 (FIG. 4) of relay 97 (FIGS. 5 and 6) so that this relay may be energized either from contact 65 or contact 66, depending on the position of the switch 70.

For purposes of description of the operation of the system, assume that the operator moves the control arm 64 to contact position 65 (FIG. 4) which we will identify as the forward direction connection. At time zero, the circuit is in the condition shown with the two relay coils 68 and 69 de-energized and the switch 70 in contact position 71.

Upon connection to the power supply the relay coils 68 and 69 are thereby energized, actuating relays 94 and 97, and moving the latching mechanism to the position shown in FIG. 6 with the armature 98 of the relay 97 moving to the position shown in the dotted lines to lift the roller 100 out of the path of the latch 101. As the armature 93 moves into the position shown in FIG. 6, it actuates the switch 70 from contact position 71 to contact position 72, thereby de-energizing the coil 69 of relay 97. The armature 98 carrying the detent arm 99 and the roller 100 then moves back to the position shown in the solid lines in FIG. 6. In this position, the roller 100 engages the latch 101 to hold the linkage in the position shown, with the detent 88 engaging the lip 91 on the switch arm 76. It might be noted here that since the operator has as yet not moved the control lever 58 into an operating condition, the controller shaft 74 and the cam 73 are in the off position with the switch arm 76 being thereby held in the position shown in the solid lines in FIG. 5 by reason of the engagement of the cam tang 75 with the roller 79.

Now as the operator moves the control lever 58 to bring the control arm 59 onto the contact sector 60 (FIG. 3), the relay 54' is actuated and the circuit of FIG. 1 is connected for series operation. At the same time, sequencing of the controller is initiated and the step switching sequence already described begins. As this happens, the controller shaft 74 begins to sequence in the clockwise direction as viewed in FIGS. 5 and 6, moving the cam tang 75 out of engagement with the roller 79. In the condition just described, however, the detent 88 holds the switch arm in the position shown in the solid lines in FIG. 5, as illustrated in FIG. 6, thereby establishing a circuit through the reversing contactors from the terminal post 82 through the wire 83 and the contacts 80 and 84. Although we have described the foregoing sequence with respect to only one of the reversing contactors, it will be appreciated that all four reversing contactors 48, 49, 50 and 51 are actuated in the same manner with the detent 88 in each case holding the switch arm 76 in the position shown with the circuit being established through contacts 80 and 84. This corresponds to the forward circuit connection which is illustrated in FIG. 1. With the circuit connected in this condition the operator may then control the system through the various switching sequences for forward operation such as the power or acceleration sequence described above.

Assume now that the operator sequences the controller back to the off position with the cam tang 75 once again engaging the roller 79 and that operation in the reverse mode is now desired. It will be observed that even though the relay 94 is de-energized, the latching mechanism is still held in the position shown in FIG. 6 because of the locking action of the roller 100 against the latch arm 101, as has previously been described. The switch 70 is therefore held in contact position 72.

To schedule reverse operation, the operator moves the control arm 64 into contact with the contact point 66 thereby energizing the relay coil 69 through contact 72 of switch 70. This energizes relay 97 to swing the detent arm 99 and its roller 100 out of engagement with the latch arm 101, thereby allowing the spring loaded mechanism to return the detents 88 to the position shown in FIG. 5. This action resets the switch 70 back to contact position 71 in the manner already described, thereby opening the connection to relay coil 69 and de-energizing relay 97. The spring 102 thereupon returns the armature 98 to the position shown in FIG. 5 to lock the mechanism controlling the detent 88 in the position shown in FIG. 5.

Now as power operation is scheduled and the controller begins to sequence, the roller 79 is allowed to track the cam 73 under the force of spring 86 and the switch arm 76 moves to establish a circuit through contacts 81 and 85. The same sequence occurs in all four reversing contactors 48, 49, 50 and 51 and each of these contactors is thus moved to the R contact point, reconnecting the fields 14, 15, 16 and 17 for reverse operation. The controller can then sequence over the same range of cam positions to schedule the various modes of reverse operation as utilized for the forward circuit connection.

It will thus be observed that the operator may select either the forward or reverse modes of operation thereby setting the latching mechanisms 87 of the reversing contactors in the corresponding condition to either hold the switch arms 76 in one circuit condition or permit their actuation to the opposite condition, with the same controller cam sequencing being utilized for both modes of operation. This allows full sequencing capability in both the forward and reverse modes with only about one-half of the cam positions otherwise normally required. We have found, in the application of our invention to electric railway control systems, that we can accommodate the full switching range with only a single controller, whereas in the past two separate controllers were required. Very substantial advantages in the areas of reduced cost and reduced complexity of this equipment are thereby obtained, and these advantages are secured without any compromise in the operating capability of the system.

It should be recognized, of course, that the advantages of our invention are not limited to systems in which its application permits the use of only a single controller, since the basic advantage of a substantial reduction in the number of required cam positions may be realized in any control system of this general type. In addition, it should be appreciated that the particular embodiment presented is illustrative only and that our invention is not limited to the details of the system described. Thus, various changes, substitutions and modifications may be made in the embodiment set forth herein without departing from the true scope and spirit of our invention as we have defined it in the appended claims.

What is claimed as new and is desired to secure by Letters Patent of the United States is:

1. An electric railway control system for controlling one or more railway traction motors comprising:
    (a) a sequentially operable switching controller having a range of cam positions over which cam actuated contactors are sequentially operated,
    (b) a reversing contactor associated with each of said traction motors and operable between first and second circuit conditions for connecting the field windings of said motors for forward or reverse operation,
    (c) cam means for actuating said reversing contactor,
    (d) said cam means being operable to actuate said reversing contactor to said first circuit condition when said controller is in its off position, and
    (e) latching means actuable between two positions to hold said reversing contactor in said first circuit condition against actuation by said cam means when said latching means is in one of said two positions and to release said reversing contactor to permit actuation to said second circuit condition by said cam means when said latching means is in the other of said two positions.

2. In an electric railway control system having one or more traction motors and at least one sequentially operable controller for controlling said traction motors, means for allowing forward and reverse operation of said traction motors over a common range of cam positions of said controller comprising:
    (a) a reversing contactor associated with each of said traction motors and operable between first and second circuit conditions to connect said traction motors for either forward or reverse operation,
    (b) cam means operated by said controller for actuating said reversing contactors, and
    (c) latching means operable between two conditions to hold said reversing contactors against actuation by said cam means in one of said two conditions and to release said reversing contactors in the other of said two conditions to permit actuation by said cam means.

3. A sequentially operable controller for an electric railway traction motor control system comprising:
    (a) at least one reversing contactor operable between first and second circuit conditions and connectable to a traction motor to establish forward or reverse circuit connections,
    (b) cam means on said controller for actuating said reversing contactor,
    (c) said cam means being set to actuate said reversing contactor to said first circuit condition when said controller is in its off position, and
    (d) latching means operable between first and second positions to engage said reversing contactor in said first position to hold said reversing contactor in said first circuit condition against actuation by said cam means and to release said reversing contactor in said second position to permit actuation of said reversing contactor to said second circuit condition by said cam means.

4. An electric railway traction motor control system comprising:
    (a) a sequentially operable switching controller connectable to control one or more traction motors,
    (b) reversing contactors connectable to each of said traction motors and operable between first and second circuit conditions to connect said traction motors for forward or reverse operation,
    (c) cam means on said controller for actuating said reversing contactors,
    (d) said cam means being operable to actuate said reversing contactors to said first circuit condition when said controller is in its off position,
    (e) latching means associated with each of said reversing contactors actuable between two positions to hold said reversing contactors in said first circuit condition against actuation by said cam means when said latching means is in one of said two positions and to release said reversing contactors to permit actuation by said cam means to said second circuit condition when said latching means is in the other of said two positions,
    (f) relay means for setting said latching means to either of said first or second positions,
    (g) detent means for holding said latching means in either of its two positions, and
    (h) means for releasing said detent means to permit movement of said latching means between said first and second positions.

5. In a sequentially operable controller for electric railway control systems:
    (a) a reversing contactor including a switch arm operable between first and second circuit conditions and connectable to a traction motor for providing forward and reverse circuit connections,
    (b) cam means for actuating said switch arm between said first and second circuit conditions,
    (c) said cam means being operable to actuate said switch arm to said first circuit condition when said controller is in its off position, and
    (d) latching means engageable with a portion of said switch arm and operable between two positions to engage said switch arm in one position and hold it in said first circuit condition against actuation by said cam means and to release said switch arm in the other of said two positions to permit actuation of said switch arm to said second circuit condition by said cam means.

6. Apparatus as set forth in claim 5 including releasable detent means for holding said latching means in either of its two positions.

7. In a system for controlling one or more electric motors, the combination comprising:
    (a) a sequentially operable switching controller including cam means providing a range of cam positions over which cam actuable resistance contactors are sequentially operated to control the amount of resistance in the system;
    (b) at least one cam actuable contactor arranged to be actuated by the cam means of said controller between first and second circuit conditions for establishing first and second system conditions respectively; and
    (c) latching means actuable between two positions, said latching means being operative in one of its positions to hold said last named contactors in said first circuit condition against actuation by said cam means and in the other of its positions to allow said contactor to be cam actuated to said second circuit condition.

References Cited by the Examiner

UNITED STATES PATENTS

| | | | |
|---|---|---|---|
| 953,420 | 3/10 | Hewlett | 200—102 X |
| 2,255,905 | 9/41 | Somers et al. | 317—136 X |
| 2,696,536 | 12/54 | Coggeshall et al. | 317—136 X |
| 2,961,068 | 11/60 | Yanick et al. | |
| 3,034,031 | 5/62 | Lichtenfels | 318—274 |
| 3,089,931 | 5/63 | Cunningham. | |

FOREIGN PATENTS 289,862  1/16  Germany.

ORIS L. RADER, *Primary Examiner.*